United States Patent
Almada

(10) Patent No.: US 8,672,572 B1
(45) Date of Patent: Mar. 18, 2014

(54) COOKING OIL APPLICATOR FOR A HOT GRILL

(76) Inventor: Samuel M Almada, Chandler, AZ (US)

( * ) Notice: Subject to any disclaimer, the term of this patent is extended or adjusted under 35 U.S.C. 154(b) by 0 days.

(21) Appl. No.: 13/591,114

(22) Filed: Aug. 21, 2012

(51) Int. Cl.
*A47J 37/07* (2006.01)

(52) U.S. Cl.
CPC .................................. *A07J 37/0786* (2013.01)
USPC .......................... 401/205; 401/280; 401/281

(58) Field of Classification Search
USPC .......................... 401/205, 280, 281; 222/237
See application file for complete search history.

(56) References Cited

U.S. PATENT DOCUMENTS

| 2,100,855 | A | * | 11/1937 | Kelly | 401/205 |
| 2,990,564 | A | * | 7/1961 | Sweeney et al. | 401/23 |
| 5,870,525 | A | * | 2/1999 | Young | 392/395 |
| 5,934,296 | A | * | 8/1999 | Clay | 132/320 |
| 6,439,790 | B1 | * | 8/2002 | Kay | 401/149 |
| 6,443,646 | B1 | * | 9/2002 | MacDonald | 401/39 |
| 6,991,393 | B2 | * | 1/2006 | Tufts et al. | 401/133 |
| 7,632,033 | B2 | * | 12/2009 | Wales | 401/37 |
| 7,909,526 | B2 | * | 3/2011 | Wales | 401/39 |
| 8,099,822 | B2 | * | 1/2012 | Dale et al. | 15/231 |
| 8,202,016 | B2 | * | 6/2012 | Wales | 401/25 |
| 2005/0207820 | A1 | * | 9/2005 | Franczak et al. | 401/39 |
| 2012/0063836 | A1 | * | 3/2012 | Gilbert et al. | 401/261 |

OTHER PUBLICATIONS

NR Steel Rubber Coating Metal Gear, Feb. 18, 2012, Mountain Rubber Manufacturing Limited, p. 1.*

* cited by examiner

*Primary Examiner* — David Walczak
*Assistant Examiner* — Joshua Wiljanen
(74) *Attorney, Agent, or Firm* — Morgan Law Offices, PLC

(57) ABSTRACT

A cooking oil applicator comprises a body, including: a tank capable of holding cooking oil; a sponge capable of absorbing some of the cooking oil; a flow control valve situated between the tank and the sponge for controlling an amount of the cooking oil flowing from the tank to the sponge; and a fire-retardant pad below the sponge capable of receiving cooking oil from the sponge and facilitating application of the cooking oil to a hot grill. The tank includes a level window so that the user can determine the degree to which the tank is full. Additionally, the cooking oil applicator includes a handle attached to the body for holding the cooking oil applicator during usage. The cooking oil applicator also includes a cradle attachable to the body allowing the cooking oil applicator to be placed safely on a flat surface while not in use.

13 Claims, 3 Drawing Sheets

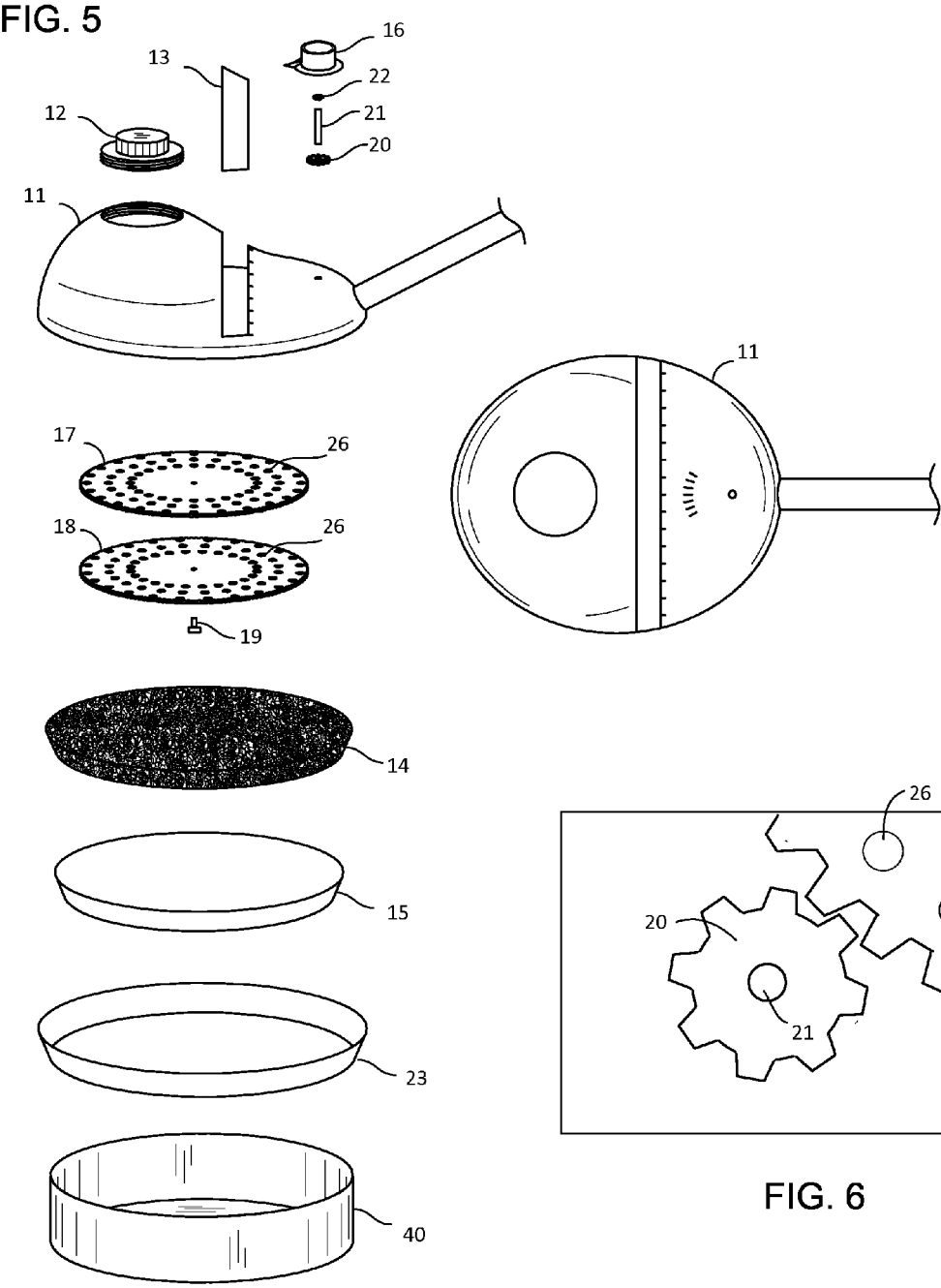

COOKING OIL APPLICATOR FOR A HOT GRILL

FIELD OF THE INVENTION

The present invention relates to the field of grilling equipment and utensils, and, more particularly, to a cooking oil applicator for a hot grill.

BACKGROUND

To ensure that a food item, such as a steak, maintains good contact with and does not stick to a barbecue grill, it is necessary that the grill first be clean and well-oiled. Cleaning the grill can be accomplished by using a wire brush or steel wool pad. However, oiling the grill is more problematic. A common way to oil a grill is by saturating a paper towel with oil, then using tongs to hold the paper towel to apply the oil on the cooking grate while it is hot. However, this approach is time consuming, messy, and wasteful.

Several prior art references relate to devices for making the oiling process easier. U.S. Patent Published Application No. US2005/0207820 to Franczak, for example, discloses a barbeque grill oiler that includes an applicator with a sponge and/or scrubber for contacting the grill to apply oil to the grill. However, this reference does not disclose a mechanism for careful control of the flow of the oil and requires that the grill be cool before application. As another example, U.S. Patent Published Application No. US2006/0029457 to Dale et al. discloses a grill oiler for applying oil to a grill comprising a handle, an applicator body attached to the handle, and an applicator surface attached to the applicator body. However, this device has many parts, suffers from an overly complex design, and could be difficult to clean.

SUMMARY OF THE INVENTION

One aspect of the disclosure relates to a cooking oil applicator. In one embodiment, the cooking oil applicator comprises a body, including: a tank capable of holding cooking oil; a sponge capable of absorbing some of the cooking oil; a flow control valve situated between the tank and the sponge for controlling an amount of the cooking oil flowing from the tank to the sponge; and a fire-retardant pad below the sponge capable of receiving cooking oil from the sponge and facilitating application of the cooking oil to a hot grill. The tank includes a level window so that the user can determine the degree to which the tank is full. Additionally, the cooking oil applicator includes a handle attached to the body for holding the cooking oil applicator during usage. The cooking oil applicator also includes a cradle attachable to the body allowing the cooking oil applicator to be placed safely on a flat surface while not in use.

In an embodiment, the flow control valve comprises first and second coaxial disks in contact with each other, each of the disks having a respective set of apertures (holes), wherein the flow control valve assumes an open position when at least one aperture of the first disk overlaps an aperture of the second disk so as to allow oil to flow through the overlapping apertures. Preferably, the first disk is made of metal and the second disk is made of plastic, wherein the first disk is rotatable and the second disk is stationary. To allow rotation of the first disk, the first disk can include a plurality of teeth along lateral edges thereof, the device further including a smaller, third disk comprising a gear meshed with the teeth so as to allow rotation of the first disk as the third disk is rotated. The third disk is attached to a shaft along the longitudinal axis of the third disk, the shaft attached to a knob on a distal end reachable by a user. In other embodiments, the first and the third disk lack teeth. In an embodiment, the lateral surfaces of the first disk and/or the third disk include friction enhancements such as ridges, grooves, or a rubber coating.

These and other aspects, features, and advantages of the present invention will become apparent from the following detailed description of preferred embodiments, which is to be read in connection with the accompanying drawings.

BRIEF DESCRIPTION OF THE DRAWINGS

FIG. 5 shows an exploded view of the cooking oil applicator; and

FIG. 6 shows a close-up view of an exemplary mechanism for controlling the flow of oil for the cooking oil applicator.

DETAILED DESCRIPTION

Figure 1:
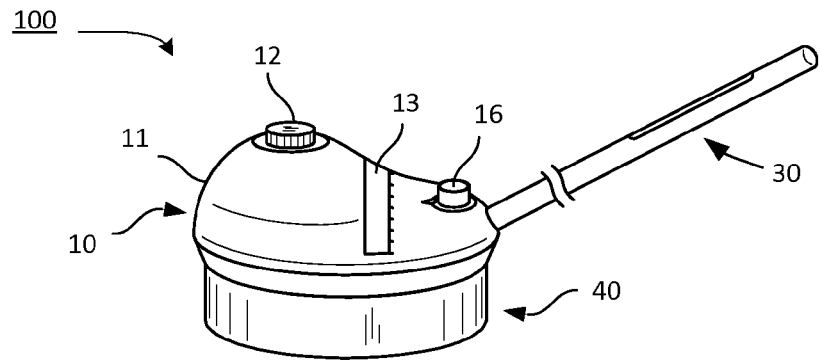
FIG. 1 shows an exemplary cooking oil applicator, according to an embodiment of the present invention.

FIG. 1 illustrates an exemplary cooking oil applicator 100, according to an embodiment of the present invention. As shown, the cooking oil applicator 100 includes a body 10, a handle 30, and an end cap 40. The handle 30 is attached to the body 10 to facilitate usage of the cooking oil applicator 100 for oiling a hot grill. The end cap 40 cradles the device during non-usage.

Figure 2:
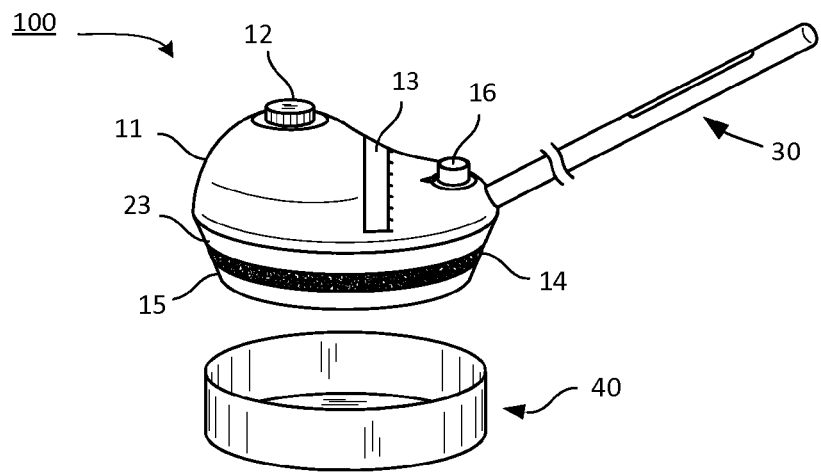
FIG. 2 shows the exemplary cooking oil applicator of FIG. 1 with the end cap removed.
Figure 3:
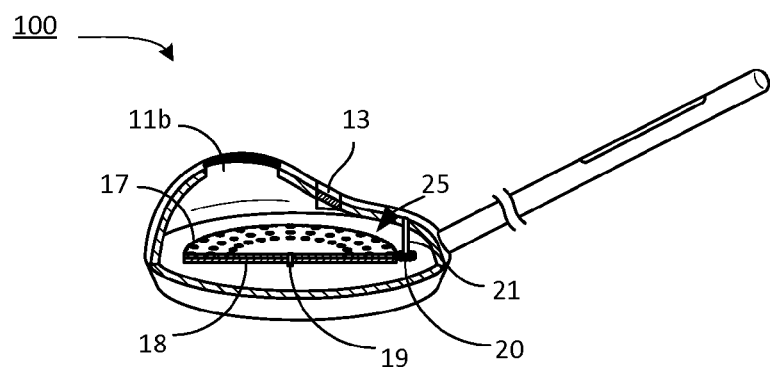
FIG. 3 shows a cutaway view of the cooking oil applicator.
Figure 4:
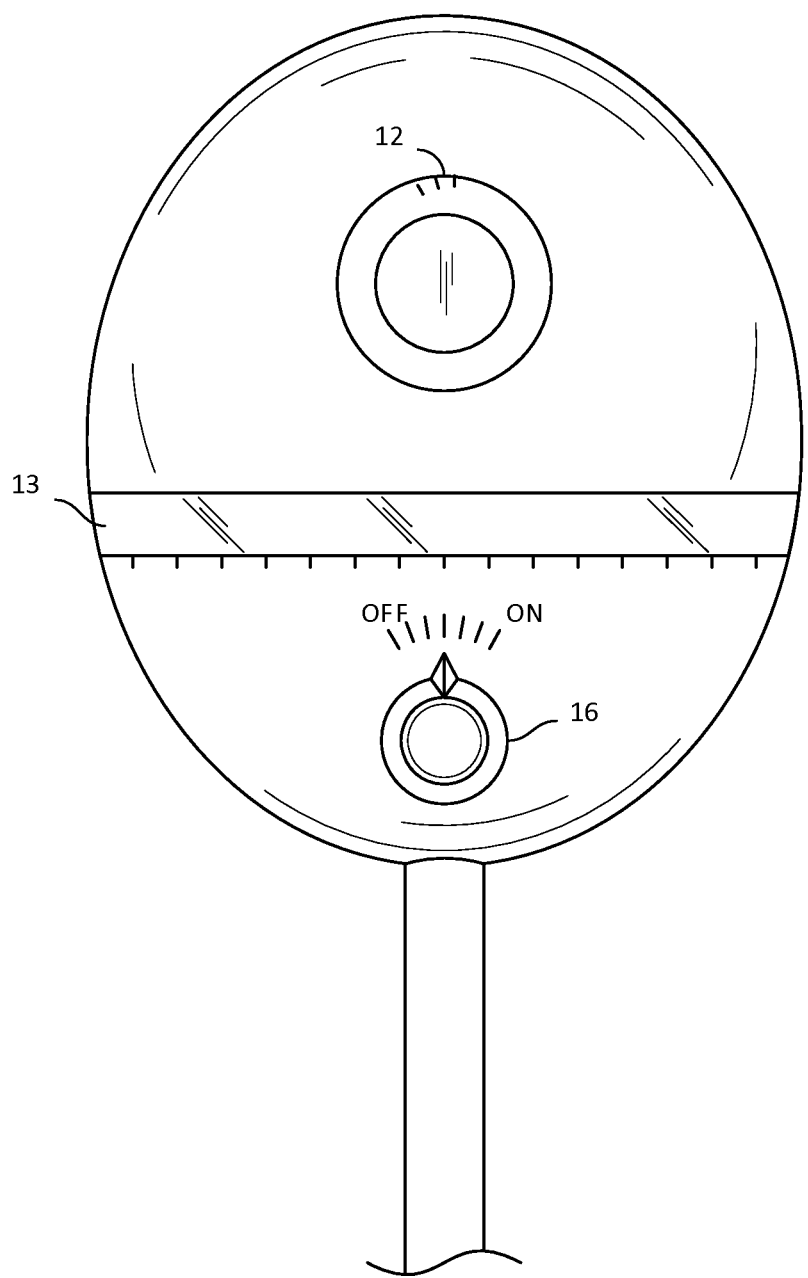
FIG. 4 shows a top view of the cooking oil applicator.

FIG. 2 shows the oil applicator 100 with the end cap 40 removed exposing a sponge 14 and a fire-retardant pad 15 adjacent thereto. The sponge 14 and the fire-retardant pad 15 can be attached together or made as a single piece. A ring 23 which can be frictionally fit to an underside of the tank 11 is used to hold the sponge 14/fire-retardant pad 15 in place. The fire-retardant pad 15 is in fluid communication with the sponge 14. FIG. 3 illustrates a cutaway view of the cooking oil applicator 100 showing a flow control valve 25 situated between the oil tank 11 and the sponge 14. FIG. 4. shows a top view of the cooking oil applicator 100 including a knob 16 to control the flow of oil.

The body 10 includes an oil tank 11 (preferably constructed of stainless steel) for storing the cooking oil in an interior portion 11b thereof. The oil tank 11 includes a filling cap 12 which unscrews to expose an opening to the interior portion 11b. Oil can be poured into the oil tank 11 through the opening when the filling cap 12 is removed. Thereafter, the filling cap 12 can be screwed back on (or otherwise re-attached). The oil tank 11 can also include a level window 13 to show how much oil is presently stored in the oil tank 11. The level window 13 can be made by attaching a sheet of a transparent plastic or glass material over an opening in the oil tank 11. A user can look through the level window 13 into the oil tank 11 to determine the oil level.

FIG. 5 shows an exploded view of the cooking oil applicator 100. In an embodiment, the flow control valve 25 comprises first and second coaxial disks 17, 18 in contact with each other, each of the disks 17, 18 having a respective set of apertures (holes) 26, wherein the flow control valve 25 assumes an open position when at least one aperture 26 of the first disk 17 overlaps an aperture 26 of the second disk 18 so as to allow oil to flow through the overlapping apertures 26. The user can open or close the flow control valve 25 in varying degrees by turning the knob 16.

As shown, a rivet 19 is placed through respective central holes of the coaxial disks 17, 18. The rivet 19 can be attached to an underside (not shown) of the tank 11 on one end with the rivet head protruding from the central holes so that the disks 17, 18 remain firmly pressed against each other. In other embodiments, another type of fastener can be used instead of the rivet 19, such as, for example, a nut/bolt combination, a clevis pin, a tapered pin, etc. The underside of the tank 11 has an opening to allow oil to flow from the tank 11 when the flow control valve 25 is open. Preferably, one of the disks is held in a stationary manner while the other disk is allowed to rotate. In the present embodiment, the first disk 17 is the disk allowed to rotate. Preferably, the rotating disk will be made of a harder material than the non-rotating disk. In the present embodiment, the first disk 17 is stainless steel and the second disk 18 is plastic.

In an embodiment, the first disk 17 has a plurality of teeth along lateral edges thereof forming a gear and a smaller, third disk 20 comprising another gear is meshed with the teeth of the first disk (as depicted in FIG. 6) so as to allow rotation of the first disk 17 as the third disk 20 is rotated. The third disk 20 is attached to a shaft 21 along the longitudinal axis of the third disk 20, and the shaft 21 is attached to the knob 16 on a distal end reachable by a user. At least one O-ring 22 can be placed between the knob 16 and the shaft 21 to prevent leakage from the shaft 21. In an embodiment, the first disk 17 and the third disk 20 lack teeth. In an embodiment, the lateral surfaces of the first disk 17 and/or the third disk 20 include friction enhancements such as ridges, grooves, or a rubber coating. In this embodiment, the coefficient of friction between the first disk 17 and the third disk 20 is sufficient to allow rotation of the first disk 17 with little effort when the user rotates the knob 16.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A cooking oil applicator, comprising:
    a tank capable of holding oil;
    a sponge capable of absorbing oil;
    a flow control valve situated between the tank and the sponge for controlling an amount of the oil flowing from the tank to the sponge, the flow control valve including a first disk having a plurality of teeth along lateral edges thereof and a second disk, the first disk and the second disk being coaxial and each having a respective set of apertures, control of the oil flow regulated by rotation of the first disk;
    a third disk comprising a gear meshed with the teeth;
    a shaft attached to the third disk disposed substantially along the longitudinal axis of the third disk and extending vertically through the tank;
    a knob attached to a distal end of the shaft so that rotation of the knob permits rotation of the shaft and the first disk as the third disk is rotated and
    a fire-retardant pad adjacent the sponge capable of receiving oil from the sponge and facilitating application of the oil to a hot grill.

2. The cooking oil applicator of claim 1, wherein the flow control valve assumes an open position when at least one aperture of the first disk overlaps with an aperture of the second disk to such an extent so as to allow oil to flow through the overlapping apertures.

3. The cooking oil applicator of claim 1, wherein one or more of the first disk and the third disk include friction enhancements.

4. A cooking oil applicator, comprising:
    a body, including:
    a tank capable of holding oil;
    a sponge capable of absorbing oil;
    a flow control valve situated between the tank and the sponge for controlling an amount of the oil flowing from the tank to the sponge, wherein the flow control valve comprises first and second coaxial disks in contact with each other, each of the disks having a respective set of apertures, wherein the flow control valve assumes an open position when at least one aperture of the first disk overlaps an aperture of the second disk to such an extent so as to allow oil to flow through the overlapping apertures.
    a third disk having a lateral side in frictional contact with a lateral side of the first disk;
    a shaft attached to the third disk disposed substantially along the longitudinal axis of the third disk and extending vertically; and
    a knob attached to the shaft so that rotation of the knob permits rotation of the shaft and the first disk as the third disk is rotated.

5. The cooking oil applicator of claim 4, wherein the first and second coaxial disks have a different hardness from each other.

6. The cooking oil applicator of claim 5, wherein the first disk is made of metal and the second disk is made of plastic.

7. The cooking oil applicator of claim 4, wherein the first disk is rotatable and a second disk is stationary.

8. The cooking oil applicator of claim 4, further including a handle attached to the body for holding the cooking oil applicator during usage.

9. The cooking oil applicator of claim 4, wherein the tank is made of stainless steel.

10. The cooking oil applicator of claim 4, wherein the tank includes a level window.

11. The cooking oil applicator of claim 4, further comprising a pad adjacent the sponge capable of receiving oil from the sponge and facilitating application of the oil to a hot grill.

12. The cooking oil applicator of claim 4, further including a cradle attachable to the body allowing the cooking oil applicator to be placed on the ground while not in use without the pad touching the ground.

13. A cooking oil applicator, comprising:
    means for storing cooking oil;
    means for controlling flow of the cooking oil; and
    means for applying the cooking oil to a hot grill.

* * * * *